US008836305B2

(12) United States Patent
Sasao et al.

(10) Patent No.: US 8,836,305 B2
(45) Date of Patent: Sep. 16, 2014

(54) DC/DC CONVERTER (71) Applicant: Sony Computer Entertainment Inc., Tokyo (JP)

(72) Inventors: Kazuki Sasao, Tokyo (JP); Kazuaki Mitsui, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/751,710

(22) Filed: Jan. 28, 2013

(65) Prior Publication Data

US 2013/0200869 A1 Aug. 8, 2013

(30) Foreign Application Priority Data

Feb. 2, 2012 (JP) .................................. 2012-021268

(51) Int. Cl.
*G05F 1/40* (2006.01)
*G05F 1/46* (2006.01)

(52) U.S. Cl.
CPC ........................................ *G05F 1/46* (2013.01)
USPC ........................................................ 323/282

(58) Field of Classification Search
USPC ............................................ 323/282–290, 351
See application file for complete search history.

(56) References Cited

U.S. PATENT DOCUMENTS

| | | | |
|---|---|---|---|
| 5,982,160 A | 11/1999 | Walters | |
| 6,469,481 B1 | 10/2002 | Tateishi | |
| 6,952,093 B1 * | 10/2005 | Broach et al. | 323/290 |
| 7,109,693 B2 * | 9/2006 | Yoshida et al. | 323/282 |
| 7,118,316 B2 | 10/2006 | Gombert | |
| 7,315,153 B2 * | 1/2008 | Tazawa et al. | 323/272 |
| 7,358,710 B2 * | 4/2008 | Luo et al. | 323/282 |
| 7,554,409 B1 * | 6/2009 | Zhang et al. | 330/298 |
| 7,615,973 B2 * | 11/2009 | Uehara | 323/224 |
| 7,696,738 B2 * | 4/2010 | Kasai et al. | 323/285 |
| 7,728,573 B2 * | 6/2010 | Capilla et al. | 323/288 |
| 7,733,074 B2 * | 6/2010 | Hasegawa et al. | 323/284 |
| 7,759,912 B2 * | 7/2010 | Weng et al. | 323/222 |
| 7,764,053 B2 * | 7/2010 | Mehas et al. | 323/222 |
| 8,004,263 B2 * | 8/2011 | Hirata et al. | 323/285 |

(Continued)

FOREIGN PATENT DOCUMENTS

| | | | |
|---|---|---|---|
| JP | 2000193687 A | 7/2000 |
| JP | 2000227808 A | 8/2000 |
| JP | 2005515367 A | 5/2005 |
| JP | 2006287900 A | 10/2006 |

OTHER PUBLICATIONS

Office Action issued for corresponding Japanese Patent Application No. 2012-021268, dated Nov. 26, 2013.

(Continued)

*Primary Examiner* — Adolf Berhane
(74) *Attorney, Agent, or Firm* — Matthew B. Dernier, Esq.; Gibson & Dernier LLP (57) ABSTRACT

Based upon a detection voltage $V_L$ that develops between ISEN+ and ISEN− terminals, a current detection circuit detects a coil current $I_L$ that flows through an inductor. A measurement circuit is connected to an inductor, and measures an inductance value L and a DC resistance value $R_{DC}$ of the inductor in a calibration operation before normal operation of a DC/DC converter. Based upon the inductance value L and the DC resistance value $R_{DC}$ thus measured, the current detection circuit detects the coil current $I_L$ using the detection voltage $V_L$.

11 Claims, 5 Drawing Sheets

(56) References Cited

U.S. PATENT DOCUMENTS

| | | | |
|---|---|---|---|
| 8,558,479 B2 * | 10/2013 | Kawata et al. | 315/291 |
| 8,638,532 B2 * | 1/2014 | Mehas et al. | 361/18 |
| 8,669,934 B2 * | 3/2014 | Sasaki | 345/102 |
| 2005/0141984 A1 | 6/2005 | Gombert | |
| 2006/0234668 A1 | 10/2006 | Uchitomi | |
| 2006/0275099 A1 | 12/2006 | Gombert | |

OTHER PUBLICATIONS

Office Action and English translation for corresponding JP Patent Application No. 2012-021268, dated May 20, 2014.

* cited by examiner

DC/DC CONVERTER

BACKGROUND OF THE INVENTION

1. Field of the Invention

The present invention relates to a DC/DC converter.

2. Description of the Related Art

Figure 1:
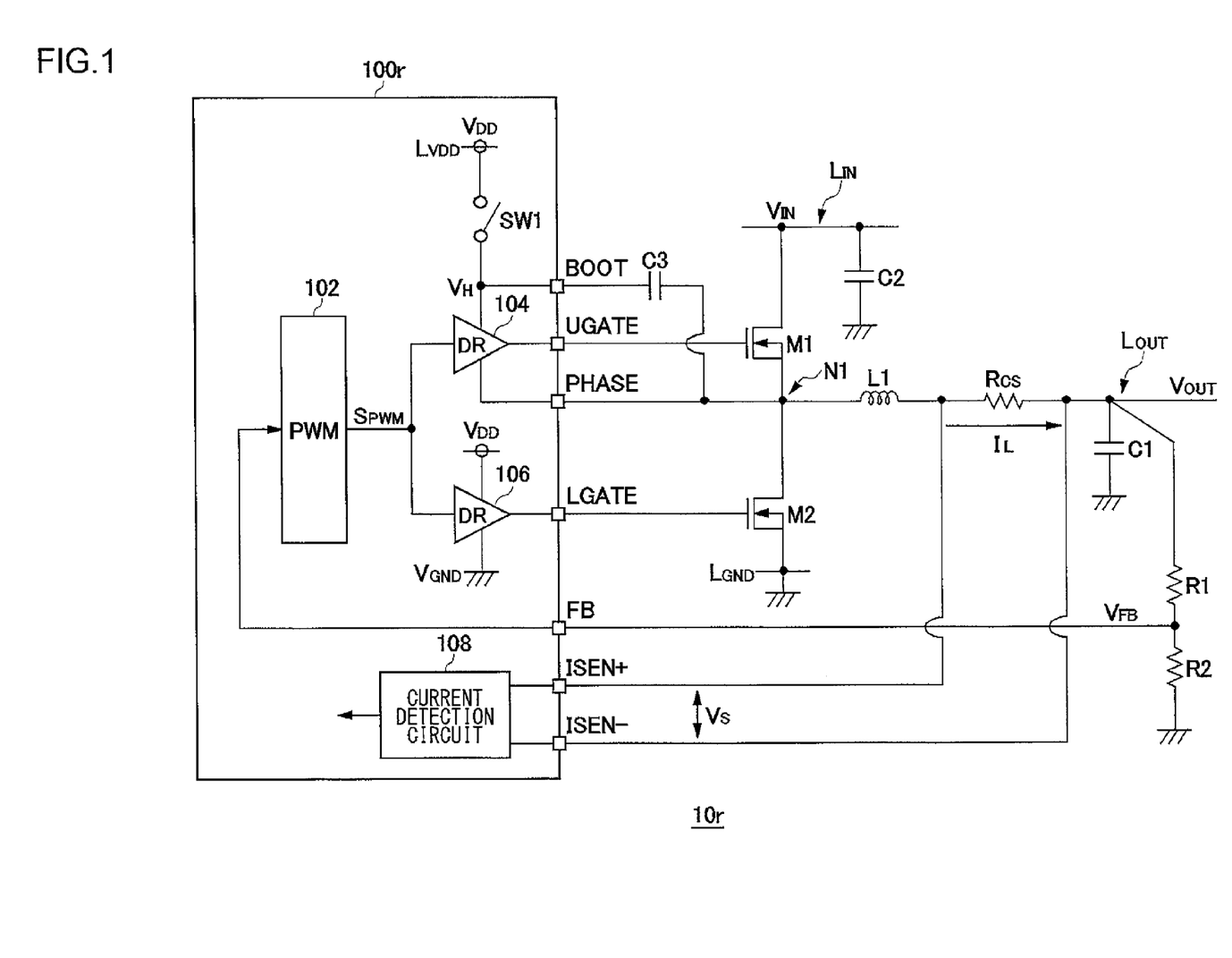
FIG. 1 is a circuit diagram which shows a configuration of a DC/DC converter investigated by the present inventors.

Electronic devices such as personal computers, dedicated game consoles, etc., employ a DC/DC converter (switching regulator) configured to step down a DC voltage having a given level to an optimum level for a load. FIG. 1 is a circuit diagram which shows a configuration of a DC/DC converter investigated by the present inventors.

A DC/DC converter 10r receives a DC input voltage $V_{IN}$ via its input line $L_{IN}$, steps down the DC input voltage $V_{IN}$ thus received so as to stabilize its level to a predetermined target level, and supplies the DC voltage thus stepped down to a load (not shown) connected to an output line $L_{OUT}$. The DC/DC converter 10 includes a switching transistor M1, a synchronous rectification transistor M2, an inductor L1, an output capacitor C1, a current sensing resistor $R_{CS}$, and a control IC (Integrated Circuit) 100r.

The switching transistor M1 and the synchronous rectification transistor M2 are each configured as an N-channel MOSFET (Metal Oxide Semiconductor Field Effect Transistor), and are sequentially arranged in series between the input line $L_{IN}$ and a ground line $L_{GND}$. A connection node that connects the switching transistor M1 and the synchronous rectification transistor M2 will be referred to as "switching node N1". The inductor L1 and the sensing resistor $R_{CS}$ are arranged in series between the switching node N1 and the output line $L_{OUT}$. The output capacitor C1 is arranged between the output line $L_{OUT}$ and the ground line $L_{GND}$. An input capacitor C2 is arranged between the input line $L_{IN}$ and the ground line $L_{GND}$.

An upper gate (UGATE) terminal and a lower gate (LGATE) terminal are connected to the gate of the switching transistor M1 and the synchronous rectification transistor M2, respectively. A phase terminal (PHASE) is connected to the switching node N1. The output voltage $V_{OUT}$ is divided by resistors R1 and R2. A feedback voltage $V_{FB}$, which is proportional to the output voltage $V_{OUT}$, is input to a feedback terminal (FB) of the control IC 100. Current detection terminals (ISEN+ and ISEN−) are respectively connected to the respective terminals of the sensing resistor $R_{CS}$. A bootstrap capacitor C3 is arranged between the switching node N1 and a boot terminal (BOOT).

The control IC 100r includes a pulse modulator 102, a high-side driver 104, a low-side driver 106, a current detection circuit 108, and a bootstrap switch SW1.

The pulse modulator 102 is configured to generate a pulse signal $S_{PWM}$ having a duty cycle adjusted such that the feedback voltage $V_{FB}$ matches a predetermined reference voltage. The pulse modulator 102 is configured as a known modulator, examples of which include a voltage mode modulator, a peak current mode modulator, an average current mode modulator, a fixed on-time mode modulator, a fixed off-time mode modulator, and a hysteresis control modulator. The high-side driver 104 and the low-side driver 106 are configured to perform switching of the switching transistor M1 and the synchronous rectification transistor M2 in a complementary manner according to the pulse signal $S_{PWM}$. An upper power supply terminal of the high-side driver 104 is connected to the BOOT terminal, and a lower power supply terminal thereof is connected to the PHASE terminal.

In a case in which the switching transistor M1 is configured an N-channel MOSFET, in order to turn on the switching transistor M1, there is a need to input, to the gate of the switching transistor M1, a high-level voltage $V_H$ that is higher than the input voltage $V_{IN}$. The bootstrap switch SW1 and the bootstrap capacitor C3 constitute a bootstrap circuit configured to generate a high-level voltage $V_H$.

The bootstrap switch SW1 is arranged between a power supply line $L_{VDD}$ of the control IC 100r and the BOOT terminal. The bootstrap switch SW1 is configured as a transistor or a diode. When the switching transistor M1 is off and the synchronous rectification transistor M2 is off, the bootstrap switch SW1 is turned on. When the switching transistor M1 is off and the synchronous rectification transistor M2 is on, the bootstrap switch SW1 is turned on.

When the switching transistor M1 is off, the synchronous rectification transistor M2 is on, and the bootstrap switch SW1 is on, the PHASE terminal is set to the ground voltage $V_{GND}$, and the BOOT terminal is set to the power supply voltage $V_{DD}$. In this state, the bootstrap capacitor C3 is charged by the power supply voltage $V_{DD}$.

When the switching transistor M1 is on, the synchronous rectification transistor M2 is off, and the bootstrap switch SW1 is off, the PHASE terminal is set to the input voltage $V_{IN}$. Accordingly, the high-level voltage $V_H$ that develops at the BOOT terminal is set to $(V_{IN}+V_{DD})$. The power supply voltage $V_{DD}$ is configured to be higher than the gate-source threshold voltage $V_{TH}$ of the switching transistor M1. Thus, when the high-side driver 104 supplies the high-level voltage $V_H=V_{IN}+V_{DD}$ to the gate of the switching transistor M1, the switching transistor M1 is turned on.

The current detection circuit 108 receives, as an input signal, a voltage drop (detection voltage) $V_S$ that develops at the sensing resistor $R_{CS}$. The detection voltage $V_S$ is proportional to a coil current $I_L$ that flows through the inductor L1. The coil current $I_L$ flows in a pulse manner according to switching of the DC/DC converter 10. The load current $I_{OUT}$ is represented by the time average of the coil current $I_L$. The current detection circuit 108 detects the coil current $I_L$ based upon the detection voltage $V_S$. The coil current $I_L$ thus detected is used by the pulse modulator 102 to generate the pulse signal $S_{PWM}$, or is used to perform overcurrent protection, and/or is stored in a register after being converted into a digital value. The current value thus stored in the register is used as a reference value by other ICs.

RELATED ART DOCUMENTS

Patent Documents

[Patent Document 1]
Japanese Patent Application Laid Open No. 2005-515367

In order to detect the coil current $I_L$ with high precision, the DC/DC converter 10r shown in FIG. 1 requires a sensing resistor $R_{CS}$ as an external component. This leads to a problem of an increased circuit area for mounting such an external component and increased costs.

SUMMARY OF THE INVENTION

The present invention has been made in order to solve such a problem. Accordingly, it is an exemplary purpose of an embodiment of the present invention to provide a DC/DC converter which allows the required circuit area and/or costs to be reduced.

An embodiment of the present invention relates to a DC/DC converter. The DC/DC converter comprises: an input line via which a DC input voltage is to be supplied; an output line via which a load is to be connected; a switching transistor and a synchronous rectification transistor sequentially arranged in series between the input line and a ground line; an inductor arranged such that one end thereof is connected to a switching node which is a connection node that connects the switching transistor and the synchronous rectification transistor, and another end thereof is connected to the output line; an output capacitor connected to the output line; and a control circuit configured to perform switching of the switching transistor and the synchronous rectification transistor. The control circuit comprises: a pulse modulator configured to generate a pulse signal having a duty cycle adjusted such that a DC output voltage that develops at the output line matches a predetermined target voltage; a driver circuit configured to perform switching of the switching transistor and the synchronous rectification transistor according to the pulse signal; a first detection terminal connected to the switching node; a second detection terminal connected to the output line; and a current detection circuit configured to detect, in normal operation, a current that flows through the inductor based upon a detection voltage that develops between the first detection terminal and the second detection terminal, using a measured inductance value and a measured DC resistance value.

The DC resistance value $R_{DC}$ and the inductance value L of the inductor vary with variation in its components. In order to solve such a problem, a measurement circuit is provided to the control circuit, and the DC resistance value and the inductance value are measured before normal operation. Subsequently, a parameter for the current detection circuit is individually set for each control circuit based upon the measurement result. Thus, such an arrangement is capable of detecting the coil current without a need to provide a sensing resistor for current detection, thereby allowing the circuit area and/or costs to be reduced.

Also, the current detection circuit may comprise: an RC low-pass filter configured to perform filtering of the detection voltage $V_L$ across the inductor during normal operation; and a current detection unit configured to detect a current that flows through the inductor based upon an output voltage $V_C$ of the RC low-pass filter and the DC resistance value $R_{DC}$. Also, during normal operation, the time constant $C_F \times R_F$ of the RC low-pass filter may be set to be equal to a ratio $L/R_{DC}$ between the inductance value L and the DC resistance value $R_{DC}$.

The detection voltage that develops between the respective terminals of the inductor is represented by the sum of the voltage drop across the inductance component and the voltage drop across the DC resistance component. Such an embodiment is capable of eliminating the voltage drop across the inductance component. Thus, such an arrangement is capable of detecting the current that flows through the inductor, based upon the voltage drop across the DC resistance component.

Also, with the inductance value and the DC resistance value measured by the measurement circuit as $L_0$ and $R_{DC0}$, respectively, the time constant $C_F \times R_F$ of the RC low-pass filter may be set a value represented by $C_F \times R_F = L_0/R_{DC0}$. Also, with a correction function as $F_{CMP}(X)$, and with the output of the RC low-pass filter as $V_C$, the current detection unit may be configured to calculate a coli current $I_L$ according to $I_L = V_C / \{R_{DC0} \times (1+F_{CMP}(x))\}$.

The correction function $F_{CMP}(x)$ may be a function using at least one from among the temperature, the current that flows through the inductor, and the switching frequency as a parameter.

Alternatively, the coil current $I_L$ may be directly calculated according to the following Expression using the detection voltage $V_L$ that develops between the respective terminals of the inductor without involving such an RC low-pass filter.

$$I_L = V_L / \{R_{DC0} + s \times L_0 + F_{CMP}(x)\}$$

Here, $s=j\omega$, where w represents the switching frequency ($\omega=2\pi F_{SW}$) of the DC/DC converter.

The inductance value L and the DC resistance value $R_{DC}$ of the inductor vary with variation in the temperature, the current that flows through the inductor, and the switching frequency. Accordingly, if the time constant of the RC low-pass filter is set to a fixed value regardless of variation in the inductance value and the DC resistance value, such an arrangement leads to a problem of poor current detection precision. In order to solve such a problem, by providing the correction function $F_{CMP}(x)$ so as to cancel out the variation in the inductance value and the DC resistance value, such an arrangement provides high-precision current detection.

Also, the RC low-pass filter may comprise a variable resistor. Also, the resistance value of the variable resistor may be adjusted according to the inductance value L and the DC resistance value $R_{DC}$.

Also, when the DC resistance value is greater than a predetermined threshold value, the control circuit may be configured to judge that a disconnection fault has occurred.

In a case in which a fault has occurred in the mounting of the inductor, e.g., in a case in which an open fault has occurred, the DC resistance value thus measured exhibits a very large value. Thus, such an arrangement is capable of detecting a fault in the mounting of the inductor based upon the DC resistance value.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 2:
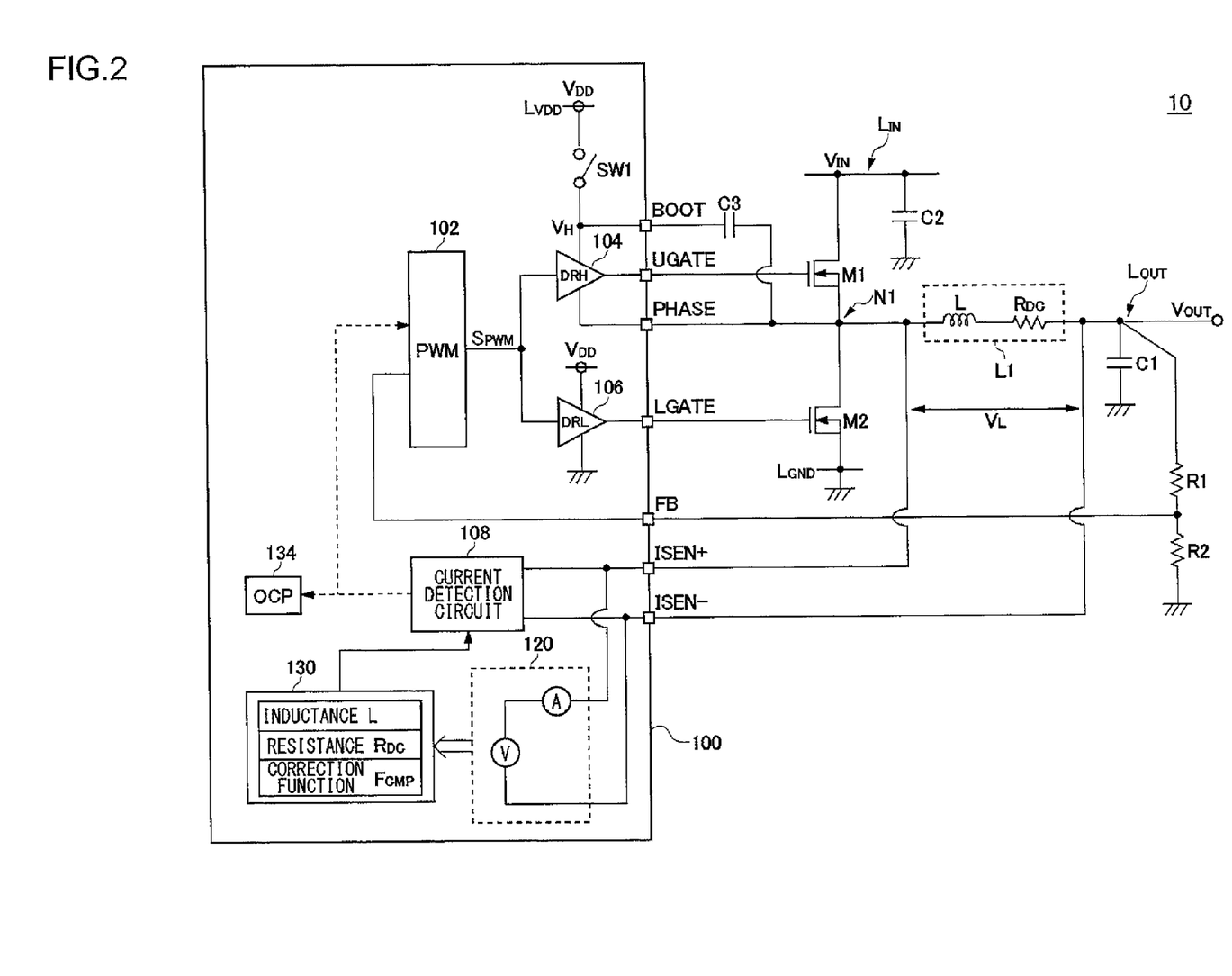
FIG. 2 is a circuit diagram which shows a configuration of a DC/DC converter according to an embodiment.

FIG. 2 is a circuit diagram which shows a configuration of a DC/DC converter 10 according to an embodiment. The DC/DC converter 10 has the same topology as that shown in FIG. 1, including the switching transistor M1, the synchronous rectification transistor M2, the inductor L1, and the output capacitor C1. The point of difference between the DC/DC converter 10 and that shown in FIG. 1 is that the sensing resistor $R_{CS}$ shown in FIG. 1 is omitted from the DC/DC converter 10 shown in FIG. 2.

The control IC 100 is configured as a function IC monolithically integrated on a single semiconductor substrate. The pulse modulator 102 generates a pulse signal $S_{PWM}$ having a duty cycle adjusted such that the DC output voltage $V_{OUT}$ that develops at the output line $L_{OUT}$ matches a predetermined target voltage. The configuration of the pulse modulator 102 is not restricted in particular. Examples of known modulators that can be employed as the pulse modulator 102 include a voltage mode modulator, a peak current mode modulator, an average current mode modulator, a fixed on-time mode modulator, a fixed off-time mode modulator, and a hysteresis control modulator.

The high-side driver 104 and the low-side driver 106 are configured to perform switching of the switching transistor M1 and the synchronous rectification transistor M2 in a complementary manner according to the pulse signal $S_{PWM}$. In order to prevent the switching transistor M1 and the synchronous rectification transistor M2 from being turned on at the same time, i.e., in order to prevent a through current from flowing, dead time may be inserted between the on time of the switching transistor M1 and the on time of the synchronous rectification transistor M2. The bootstrap capacitor C3 and the bootstrap switch SW1 are configured to generate a high-level voltage $V_H$ to be applied to the high-side driver 104.

The first current detection terminal (ISEN+) of the control IC 100 is connected to the switching node N1, and its second current detection terminal (ISEN−) is connected to the output line $L_{OUT}$. That is to say, the ISEN+ terminal and the ISEN− terminal are respectively connected to the respective ends of the inductor L1.

The inductor L1 has an inductance component L and a DC resistance component $R_{DC}$. With the coil current flowing through the inductor L1 as $I_L$, the voltage drop (which will also be referred to as the "detection voltage") $V_L$ across the inductor L1, as represented by the following Expression (1).

$$V_L=(s \times L+R_{DC}) \times I_L \qquad (1)$$

Here, s=jω, where ω represents the switching frequency (ω=2πF$_{SW}$) of the DC/DC converter 10. The detection voltage $V_L$ is input in the form of a voltage between the ISEN+ terminal and the ISEN− terminal.

Based upon the detection voltage $V_L$, the control IC 100 detects the current $I_L$ that flows through the inductor L1. In order to provide such a function, the control IC 100 includes a measurement circuit 120 and memory 130, in addition to the control IC 100r shown in FIG. 1.

In a case in which the inductance L, the DC resistance component $R_{DC}$, and the switching frequency w are each configured as a known value, the coil current $I_L$ can be calculated using Expression (1). During normal operation of the DC/DC converter 10, the current detection circuit 108 detects the coil current $I_L$ based upon the detection voltage $V_L$ that develops between the ISEN+ terminal and the ISEN− terminal. Description will be made later regarding a suitable configuration of the current detection circuit 108. The circuit format and the algorithm of the current detection circuit 108 are not restricted in particular.

The DC/DC converter 10 is calibrated before its normal operation. The measurement circuit 120 is connected between the respective ends of the inductor L1 via the ISEN+ terminal and the ISEN− terminal. In the calibration operation, the measurement circuit 120 measures the inductance value L and the DC resistance value $R_{DC}$ of the inductor L1.

For example, by measuring the current I while applying a predetermined DC test voltage $V_{TEST}$ between the ISEN+ and ISEN− terminals, the DC resistance value $R_{DC}$ is measurable by calculating $V_{TEST}/I$. In this case, the measurement circuit 120 may be configured including a constant voltage source and an ammeter.

Alternatively, by measuring the voltage V that develops between the ISEN+ and ISEN− terminals while supplying a predetermined DC test current $I_{TEST}$ to the inductor L1 via the ISEN+ and ISEN− terminals, the DC resistance value $R_{DC}$ is measurable by calculating $V/I_{TEST}$. In this case, the measurement circuit 120 may be configured including a constant current source and a voltmeter.

By measuring the current I while applying an AC test voltage $V_{TEST}$ between the ISEN+ and ISEN− terminals, and by eliminating the DC component from the current I, the inductance value L of the inductor L1 is measurable by calculating $V_{TEST}/I$. In this case, the measurement circuit 120 may be configured including an AC voltage source and an ammeter.

Alternatively, by measuring the voltage V that develops between the ISEN+ and ISEN− terminals while supplying an AC test current $I_{TEST}$ to the inductor L1 via the ISEN+ and ISEN− terminals, the inductance value L is measurable by calculating $V/I_{TEST}$. In this case, the measurement circuit 120 may be configured including an AC current source and a voltmeter.

The configuration of the measurement circuit 120 is not restricted in particular and the measurement circuit 120 may be configured as a known circuit, which can be readily understood by those skilled in this art.

The DC resistance value $R_{DC}$ and the inductance value L thus measured by the measurement circuit 120 are each converted into a digital value, and are stored in the memory 130. The memory 130 may be configured as a register or nonvolatile memory. The memory 130 stores a correction function $F_{CMP}$ described later.

By transforming Expression (1), the following Expression (2) can be obtained.

$$I_L=V_L/(s \times L+R_{DC}) \qquad (2)$$

The current detection circuit 108 accesses the memory 130 during normal operation, and calculates the coil current $I_L$ based upon the detection voltage $V_L$ according to Expression (2) using the inductance value L and the DC resistance value $R_{DC}$ stored in the memory 130.

The above is the basic configuration of the DC/DC converter 10 according to the embodiment.

The inductance L and the DC resistance value $R_{DC}$ of the inductor L1 vary with variation in its components. In order to solve such a problem, the measurement circuit 120 is provided to the control IC 100. By measuring the DC resistance value $R_{DC}$ and the inductance value L of the inductor, and by individually setting the parameters of the current detection circuit 108 for each control circuit based upon the measurement result, such an arrangement is capable of detecting the coil current $I_L$ without the need to provide such a sensing resistor $R_{CS}$ for current detection, thereby allowing the circuit area and/or costs to be reduced.

The coil current $I_L$ thus detected can be used for various kinds of signal processing performed by the control IC 100 or its external circuit.

For example, in a case in which the pulse modulator 102 is configured as a current mode modulator, the coil current $I_L$ thus detected is input to the pulse modulator 102. With such an arrangement, the duty cycle of the pulse signal $S_{PWM}$ is adjusted according to the coil current $I_L$, in addition to the feedback voltage $V_{FB}$.

Furthermore, an overcurrent protection circuit 134 compares the coil current $I_L$ with a predetermined threshold value. When the coil current $I_L$ is greater than the predetermined threshold value, the overcurrent protection circuit 134 executes predetermined overcurrent protection.

Figure 3:
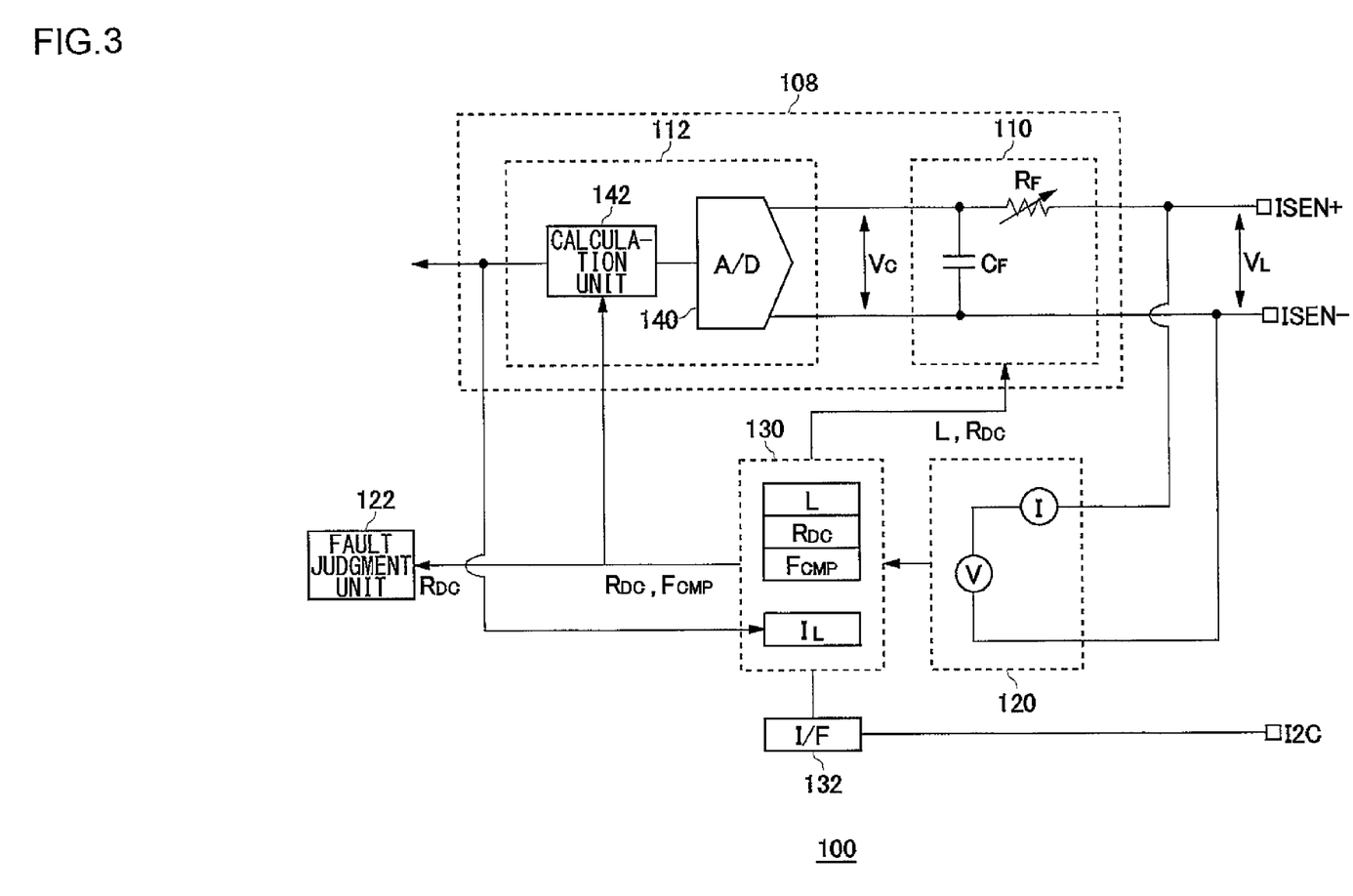
FIG. 3 is a circuit diagram which shows a current detection circuit and a peripheral circuit thereof included in a control IC.

Next, description will be made regarding a configuration of the current detection circuit 108 and a method for current detection. FIG. 3 is a circuit diagram which shows the current detection circuit 108 and its peripheral circuit included in the control IC 100.

The current detection circuit 108 includes an RC low-pass filter 110 and a current detection unit 112. The RC low-pass filter 110 receives a detection voltage $V_L$, and performs filtering of the detection voltage $V_L$ during normal operation. The RC low-pass filter 110 includes a resistor $R_F$ and a capacitor $C_F$. The output voltage $V_C$ of the RC low-pass filter 110 is represented by the following Expression (3).

$$V_C = 1/(1+s\times C_F \times R_F) \times V_L \tag{3}$$

By substituting Expression (3) into Expression (1), the following Expression (4) is obtained.

$$V_C = (1+s\times L/R_{DC})/(1+s\times C_F \times R_F) \times R_{DC} \times I_L \tag{4}$$

When the following Expression (5) holds true, $V_C$ can be represented by the following Expression (6) transformed from Expression (4).

$$(1+s\times L/R_{DC})/(1+s\times C_F \times R_F) = 1 \tag{5}$$

$$V_C = R_{DC} \times I_L \tag{6}$$

That is to say, the output voltage $V_C$ of the RC low-pass filter 110 matches a voltage obtained by eliminating the voltage drop that occurs due to the inductance L from the detection voltage $V_L$. Thus, the detection voltage $V_C$ is equal to the detection voltage $V_S$ obtained by the DC/DC converter 10r shown in FIG. 1.

In order to satisfy the conditional expression (5), the following Expression (7) should be satisfied.

$$C_F \times R_F = L/R_{DC} \tag{7}$$

That is to say, the time constant $C_F \times R_F$ of the RC low-pass filter 110 is set to be equal to the ratio $L/R_{DC}$ between the inductance value L and the DC resistance value $R_{DC}$ measured by the measurement circuit 120.

For example, the resistor $R_F$ is configured as a variable resistor, and its resistance is adjusted according to the inductance value L and the DC resistance value $R_{DC}$ thus measured such that Expression (7) holds true. The configuration of the resistor $R_F$ is not restricted in particular. Rather, the resistor $R_F$ may be configured as a known variable resistor.

Also, the capacitor $C_F$ may be configured as a variable element, in addition to or otherwise instead of the resistor $R_F$.

As a result of adjustment of the time constant of the RC low-pass filter 110, Expression (6) holds true. In this stage, the current detection unit 112 detects the coil current $I_L$ based upon the output voltage $V_C$ of the RC low-pass filter 110 and the DC resistance value $R_{DC}$ thus measured.

$$I_L = V_C/R_{DC} \tag{8}$$

The current detection unit 112 includes an A/D converter 140 and a calculation unit 142, for example.

The A/D converter 140 is configured to convert the output voltage $V_C$ of the RC low-pass filter 110 into a digital value $D_C$. The calculation unit 142 is configured to divide the digital value $D_C(V_C)$ by the DC resistance value $R_{DC}$ stored in the memory 130, so as to generate digital data which represents the coil current $I_L$.

The digital data may be stored in the memory 130. An interface circuit 132 is provided so as to allow an external circuit of the control IC 100 to access the memory 130. For example, the control IC 100 and an external processor are connected to each other via an I²C (Inter IC) bus, which allows the external processor to read out the coil current $I_L$ stored in the memory 130.

The detection voltage $V_L$ that develops between the respective ends of the inductor L1 is represented by the sum of the voltage drop across the inductance component L and the voltage drop across the DC resistance component $R_{DC}$. With such a configuration shown in FIG. 3, the voltage drop that occurs due to the inductance component L can be eliminated. Thus, such an arrangement is capable of detecting the coil current based upon the voltage drop across the DC resistance component $R_{DC}$.

When the DC resistance value $R_{DC}$ thus measured is greater than a predetermined threshold value, a fault judgment unit 122 judges that a fault has occurred in the mounting of the inductor L1 (disconnection malfunction). In a case in which a fault occurs in the mounting of the inductor L1, e.g., in a case in which an open fault occurs, the DC resistance value $R_{DC}$ thus measured exhibits a very large value. With such a DC/DC converter 10r shown in FIG. 1, there is a need to perform an additional test operation in order to detect whether or not a fault has occurred in the mounting of the inductor L1. In contrast, with the control IC 100 according to the embodiment, such an arrangement is capable of detecting a fault in the mounting of the inductor L1 based upon the DC resistance value $R_{DC}$.

Next, description will be made regarding the correction function $F_{CMP}$.

The inductance value L of the inductor L1 varies depending on the temperature T and the current $I_L$ that flows through the inductor L1. The inductance value L in the actual operation is represented by the following Expression (9) using the inductance value $L_0$ measured in the calibration and the variation $\Delta L$ from the inductance value $L_0$.

$$L = L_0 + \Delta L \tag{9}$$

The term $(1+s\times L/R_{DC})/(1+s\times C_F \times R_F)$ in Expression (4) will be represented by coefficient A. In a case in which the time constant CR of the RC low-pass filter 110 is set to $L_0/R_{DC}$, the following Expression (10) is obtained.

$$A = \{1 + s\times(L_0 + \Delta L)/R_{DC}\}/(1 + s\times L_0/R_{DC}) \tag{10}$$
$$= 1 + s\times\Delta L/R_{DC}/\{1 + s\times L_0/R_{DC}\}$$

When $s \times L_0 \gg R_{DC}$ holds true, the following Expression (11) is obtained.

$$A \approx 1 + \Delta L/L_0$$

That is to say, if the inductance value L varies by 10%, the coefficient A varies by 10%. This leads to 10% variation in the coil current $I_L$ which is measured by the current detection circuit 108, resulting in degradation of current detection precision. Similarly, if the DC resistance value $R_{DC}$ varies, the coefficient A varies, leading to degradation of current detection precision.

In order to solve such a problem, correction functions $F_L$ and $F_R$ are provided for the inductance value L and the DC resistance value $R_{DC}$, respectively.

$$L(x) = L_0 \times (1 + F_L(x)) \tag{11}$$

$$R_{DC}(x) = R_{DC0} \times (1 + F_R(x)) \tag{12}$$

Here, $R_{DC0}$ represents the DC resistance value measured in the calibration. The parameter x corresponds to at least one from among the temperature T, coil current $I_L$, and frequency s. For example, in a case in which the inductor has marked temperature dependency, the correction function $F_L$ is defined with the temperature T as the parameter. In a case in which the DC resistance value has great dependence on the coil current $I_L$, the correction function $F_R$ is defined with the coil current $I_L$ as the parameter.

The following Expression (13) is obtained based upon Expressions (11), (12), and (4).

$$V_C/I_L = \{s \times L_0(1+F_L(x)) + R_{DC0}(1+F_R(x))\}/(1+s \times C_F \times R_F) \tag{13}$$

By determining $R_F$ and $C_F$ such that the relation expression $L_0/R_{DC0} = R_F \times C_F$ is satisfied, the relation expression $L_0 = R_{DC0} \times R_F \times C_F$ holds true. By substituting the relation expression thus obtained into Expression (13), the following Expression (14) is obtained.

$$V_C/I_L = \{s \times R_{DC0} \times R_F \times C_F(1+F_L(x)) + R_{DC0}(1+F_R(x))\}/(1+s \times C_F \times R_F) \tag{14}$$

By dividing both sides of Expression (14) by $R_{DC0}$, the following Expression (15) is obtained.

$$V_C/(I_L \times R_{DC0}) = 1 + [\{F_R(x) + s \times R_F \times C_F \times F_L(x)\}/ \tag{15}$$
$$(1 + s \times C_F \times R_F)]$$
$$= 1 + [\{F_R(x) + s \times L_0/R_{DC0} \times F_L(x)\}/$$
$$(1 + s \times L_0/R_{DC0})]$$

Thus, by defining the correction function $F_{CMP}(x)$ using the following Expression (16), and by correcting the current value $I_L = V_C/R_{DC0}$ according to the following Expression (17), such an arrangement is capable of canceling out the variation in the inductance value L or the variation in the DC resistance value $R_{DC}$, thereby providing high-precision current detection.

$$F_{CMP}(x) \equiv \{F_R(x) + s \times L_0/R_{DC0} \times F_L(x)\}/(1+s \times L_0/R_{DC0})] \tag{16}$$

$$I_L = V_C/\{R_{DC0} \times (1+F_{CMP}(x))\} \tag{17}$$

Specifically, by providing the correction function $F_{CMP}(X)$ to the calculation unit 142 in addition to the DC resistance value $R_{DC}$, and by performing calculation according to Expression (17), the current $I_L$ can be calculated.

Here, when the relation expression $s \times L_0 \gg R_{DC}$ holds true, the term $F_R(x)$ is negligible. In this case, the relation expression $F_{CMP}(x) \approx F_L(x)$ holds true. Thus, the current value $I_L$ can be calculated according to the following Expression (18).

$$I_L = V_C/\{R_{DC0} \times (1+F_L(x))\} \tag{18}$$

Alternatively, as another approach, the coil current $I_L$ can be calculated based upon the detection voltage $V_L$ that develops between the respective ends of the inductor without involving the RC low-pass filter 110. By substituting Expressions (11) and (12) into Expression (1), the following Expression (19) is obtained.

$$V_L = I_L \times (R_{DC0} + s \times L_0 + R_{DC0} \times F_R(x) + s \times L_0 \times F_L(x)) \tag{19}$$

By defining the correction function $F_{CMP}(x)$ as the following Expression (20), it can be understood that the current value $I_L$ can be calculated according to the following Expression (21).

$$F_{CMP}(x) \equiv R_{DC0} \times F_R(x) + s \times L_0 \times F_L(x) \tag{20}$$

$$I_L = V_L/\{R_{DC0} + S \times L_0 + F_{CMP}(x)\} \tag{21}$$

Alternatively, an arrangement may be made in which the actual inductance value L and the actual resistance value $R_{DC}$ are calculated based upon Expressions (11) and (12) using the measured inductance value $L_0$ and the measured resistance value $R_{DC0}$, the time constant of the RC low-pass filter 110 is set based upon the calculation result, and the current detection unit 112 calculates the current $I_L$ according to Expression (8).

Figure 4:
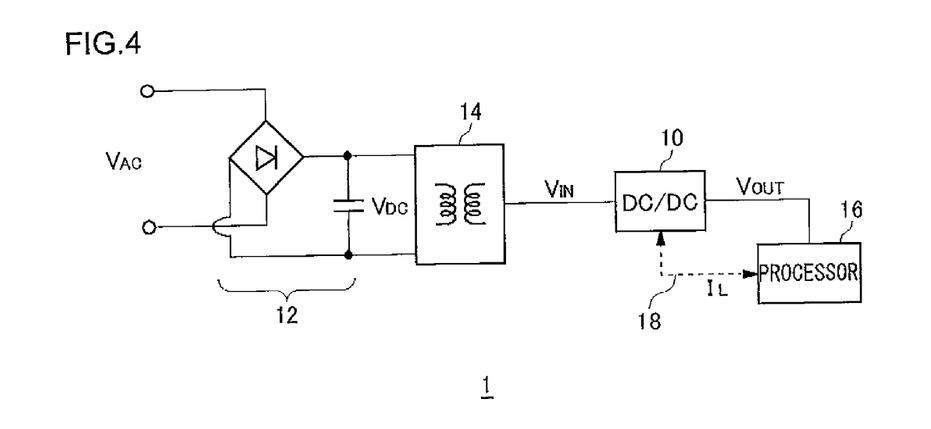
FIG. 4 is a block diagram which shows a configuration of an electronic device mounting a DC/DC converter.

Next, description will be made regarding an example application of the DC/DC converter 10. FIG. 4 is a block diagram which shows a configuration of an electronic device 1 mounting the DC/DC converter 10. The electronic device 1 may be configured as a dedicated game console or otherwise a computer. A rectifier circuit 12 rectifies a commercial AC voltage $V_{AC}$, and performs smoothing of the voltage thus rectified, so as to generate a DC voltage $V_{DC}$. An electric-insulating DC/DC converter 14 steps down the DC voltage $V_{DC}$ so as to generate an input voltage $V_{IN}$. The DC/DC converter 10 is configured to step down the input voltage $V_{IN}$, and to supply an output voltage $V_{OUT}$ to a power supply terminal of a load, e.g., a processor 16.

The DC/DC converter 10 and the processor 16 are connected to each other via an $I^2C$ bus 18. As described above, the data which represents the coil current $I_L$ measured by the DC/DC converter 10 is stored in the memory 130. The processor 16 is configured to access the memory 130 included in the DC/DC converter 10, and to acquire the its own load state based upon the coil current $I_L$. For example, according to the coil current $I_L$, the processor 16 may change the setting value of the output voltage, or may enter the power save mode.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Figure 5A:
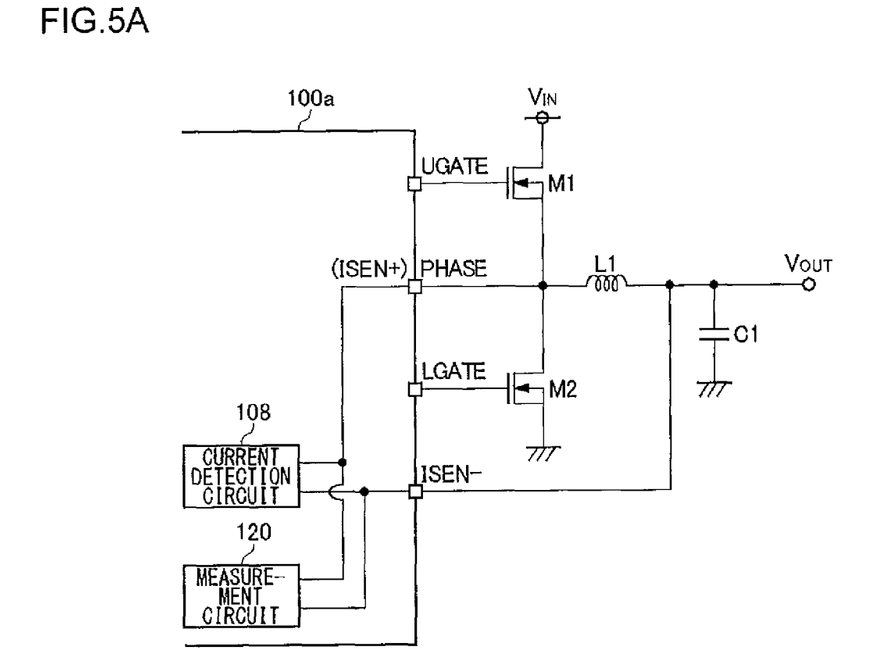
FIGS. 5A and 5B are circuit diagrams each showing a configuration of a control IC according to a modification.

FIGS. 5A and 5B are circuit diagrams each showing a configuration of a control IC 100 according to a modification. With a control IC 100a shown in FIG. 5A, the PHASE terminal is able to share the terminal used as the ISEN+ terminal. Such a configuration allows the number of pins of the control IC 100 to be reduced by one, thereby allowing its circuit area to be further reduced.

Figure 5B:
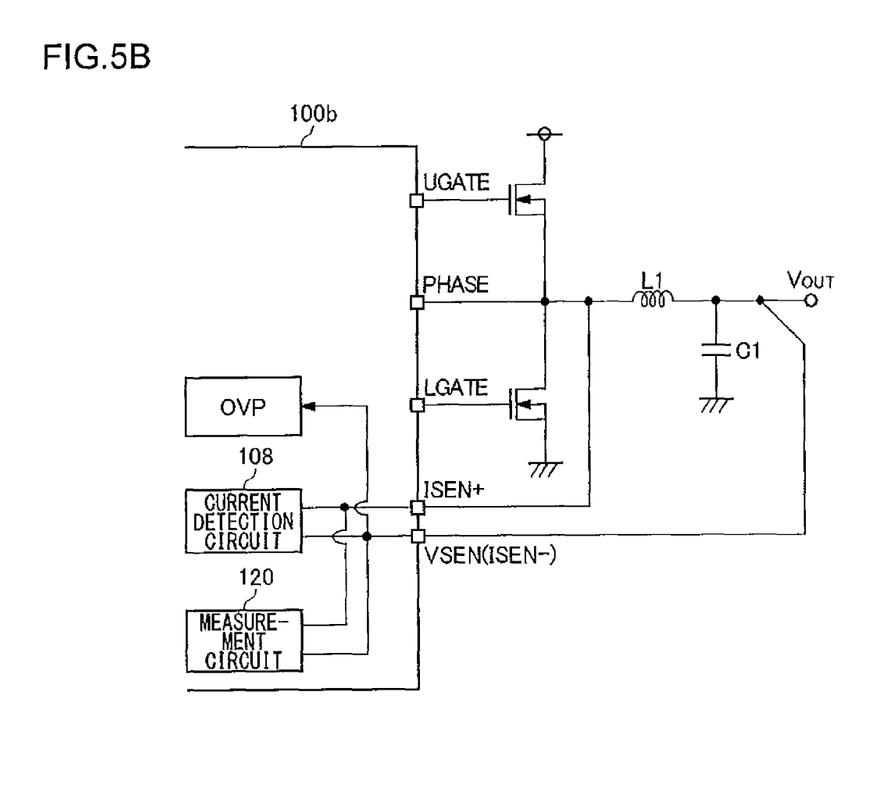

In FIG. 5B, a voltage detection (VSEN) terminal is provided to a control IC 100b, in addition to the FB terminal. The voltage at the VSEN terminal is used for overvoltage protection, for example. With such a control IC 100b including such a VSEN terminal, the VSEN terminal may also share the terminal used as the ISEN− terminal. Such a configuration allows the number of pins of the control IC 100 to be reduced by one, thereby allowing the circuit area to be further reduced.

The arrangement shown in FIG. 5A may be combined with the arrangement shown in FIG. 5B. That is to say, the PHASE terminal may also share the terminal used as the ISEN+ terminal, and the VSEN terminal may also share the terminal used as the ISEN− terminal.

Description has been made in the embodiment regarding an arrangement in which the switching transistor M1 is configured as an N-channel MOSFET. Also, a P-channel MOSFET may be employed, instead of such a switching transistor M1. In this case, the PHASE terminal, the bootstrap capacitor C3, and the switch SW1 may be omitted.

Description has been made with reference to FIG. 3 regarding an arrangement in which the coil current $I_L$ is detected by means of digital signal processing. Also, the current detection unit 112 may be configured as an analog circuit.

The A/D converter 140 may be arranged as an upstream stage of the RC low-pass filter 110. Also, the RC low-pass filter 110 may be configured as a digital filter.

Description has been made in the embodiment regarding an arrangement in which the high-side driver 104 and the low-side driver 106 are each configured as a built-in component included in the control IC 100. Also, such drivers may each be configured as an external component of the control IC 100.

The form of the correction function $F_{CMP}$ is not restricted to such a form represented by Expression (16). Also, the correction function $F_{CMP}$ may be defined in various forms, which can be readily understood by those skilled in this art.

While the preferred embodiments of the present invention have been described using specific terms, such description is for illustrative purposes only, and it is to be understood that changes and variations may be made without departing from the spirit or scope of the appended claims.

What is claimed is:

1. A DC/DC converter comprising:
   an input line via which a DC input voltage is to be supplied;
   an output line via which a load is to be connected;
   a switching transistor and a synchronous rectification transistor sequentially arranged in series between the input line and a ground line;
   an inductor having its one end connected to a switching node which is a connection node that connects the switching transistor and the synchronous rectification transistor, and having its another end connected to the output line;
   an output capacitor connected to the output line; and
   a control circuit configured to perform switching of the switching transistor and the synchronous rectification transistor, wherein the control circuit comprises:
   a pulse modulator configured to generate a pulse signal having a duty cycle adjusted such that a DC output voltage that develops at the output line matches a predetermined target voltage;
   a driver circuit configured to perform switching of the switching transistor and the synchronous rectification transistor according to the pulse signal;
   a first detection terminal connected to the switching node;
   a second detection terminal connected to the output line;
   a measurement circuit connected to the inductor via the first detection terminal and the second detection terminal, and configured to measure an inductance value and a DC resistance value of the inductor during calibration, before normal operation of the DC/DC converter; and
   a current detection circuit configured to detect, in normal operation, a current that flows through the inductor based upon a detection voltage that develops between the first detection terminal and the second detection terminal, using the inductance value and the DC resistance value thus measured.

2. A DC/DC converter according to claim 1, wherein the current detection circuit comprises:
   an RC low-pass filter configured to perform filtering of the detection voltage during normal operation; and
   a current detection unit configured to detect a current that flows through the inductor based upon an output voltage of the RC low-pass filter and the measured DC resistance value,
   wherein, during normal operation, a time constant CR of the RC low-pass filter is set to be equal to a ratio $L/R_{DC}$ between the inductance value L and the DC resistance value $R_{DC}$d.

3. A DC/DC converter according to claim 2, wherein the current detection unit is configured to correct, using a predetermined correction function, a measured current that flows through the inductor.

4. A DC/DC converter according to claim 2, wherein, with the inductance value and the DC resistance value measured by the measurement circuit as $L_0$ and $R_{DC0}$, respectively, and with a predetermined correction function of $F_{CMP}(x)$, the time constant $C_F \times R_F$ of the RC low-pass filter is set to a value represented by $C_F \times R_F = L_0/R_{DC0}$, and wherein the current detection unit is configured to calculate a current that flows through the inductor according to $I_L = V_C/\{R_{DC0} \times (1+ F_{CMP}(x))\}$.

5. A DC/DC converter according to claim 2, wherein the RC low-pass filter comprises a variable resistor, and wherein the resistance value of the variable resistor is adjusted according to the inductance value L and the DC resistance value $R_{DC}$.

6. A DC/DC converter according to claim 3, wherein the RC low-pass filter comprises a variable resistor, and and wherein the resistance value of the variable resistor is adjusted according to the inductance value L and the DC resistance value $R_{DC}$.

7. A DC/DC converter according to claim 4, wherein the RC low-pass filter comprises a variable resistor, and wherein the resistance value of the variable resistor is adjusted according to the inductance value L and the DC resistance value $R_{DC}$.

8. A DC/DC converter according to claim 1, wherein, with the inductance value and the DC resistance value measured by the measurement circuit as $L_0$ and $R_{DC0}$, respectively, with a predetermined function as $F_{CMP}(x)$, and with $s=j \times 2\pi F_{SW}$ (where $F_{SW}$ represents a switching frequency of the DC/DC converter), the current detection unit is configured to calculate an inductor current according to $I_L = V_L/\{R_{DC0} + s \times L_0 + F_{CMP}(x)\}$.

9. A DC/DC converter according to claim 1, wherein, when the DC resistance value is greater than a predetermined threshold value, the control circuit is configured to judge that a disconnection fault has occurred.

10. A DC/DC converter according to claim 1, wherein the driver circuit is arranged as an external component of the control circuit.

11. An electronic device comprising:
    a processor; and
    a DC/DC converter configured to supply a power supply voltage to a power supply terminal of the processor, wherein the DC/DC converter comprises:
    an input line via which a DC input voltage is to be supplied;

an output line via which the processor is to be connected;

a switching transistor and a synchronous rectification transistor sequentially arranged in series between the input line and a ground line;

an inductor having its one end connected to a switching node which is a connection node that connects the switching transistor and the synchronous rectification transistor, and having its another end connected to the output line;

an output capacitor connected to the output line; and a control circuit configured to perform switching of the switching transistor and the synchronous rectification transistor, and wherein the control circuit comprises:

a pulse modulator configured to generate a pulse signal having a duty cycle adjusted such that a DC output voltage that develops at the output line matches a predetermined target voltage;

a driver circuit configured to perform switching of the switching transistor and the synchronous rectification transistor according to the pulse signal;

a first detection terminal connected to the switching node;

a second detection terminal connected to the output line;

a measurement circuit connected to the inductor via the first detection terminal and the second detection terminal, and configured to measure an inductance value and a DC resistance value of the inductor in calibration, before normal operation of the DC/DC converter; and a current detection circuit configured to detect, in normal operation, a current that flows through the inductor based upon a detection voltage that develops between the first detection terminal and the second detection terminal, using the inductance value and the DC resistance value thus measured.

* * * * *